United States Patent
Jeong et al.

(10) Patent No.: US 11,552,337 B2
(45) Date of Patent: Jan. 10, 2023

(54) BATTERY PACK

(71) Applicant: SAMSUNG SDI CO., LTD., Yongin-si (KR)

(72) Inventors: Hyeon Cheol Jeong, Yongin-si (KR); Jeong Ho Kim, Yongin-si (KR); Sang Gu Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 49 days.

(21) Appl. No.: 17/095,836

(22) Filed: Nov. 12, 2020

(65) Prior Publication Data
US 2021/0175550 A1 Jun. 10, 2021

(30) Foreign Application Priority Data
Dec. 5, 2019 (KR) .......................... 10-2019-0160736

(51) Int. Cl.
| | |
|---|---|
| *H01M 10/42* | (2006.01) |
| *H01M 50/209* | (2021.01) |
| *H01M 50/543* | (2021.01) |
| *H01M 50/103* | (2021.01) |
| *H01M 50/20* | (2021.01) |

(52) U.S. Cl.
CPC ....... *H01M 10/425* (2013.01); *H01M 50/103* (2021.01); *H01M 50/20* (2021.01); *H01M 50/209* (2021.01); *H01M 50/543* (2021.01); *H01M 2010/4271* (2013.01)

(58) Field of Classification Search
CPC ................................................ H01M 10/425
See application file for complete search history.

(56) References Cited

U.S. PATENT DOCUMENTS

| | | |
|---|---|---|
| 8,828,585 B2 | 9/2014 | Ha et al. |
| 9,069,045 B2 | 6/2015 | Lee et al. |
| 9,368,838 B2 | 6/2016 | Nakagawa et al. |
| 10,403,876 B2 | 9/2019 | Choi et al. |
| 10,957,895 B2 | 3/2021 | Yanagida |
| 2010/0092854 A1 | 4/2010 | Ha et al. |
| 2013/0143086 A1 | 6/2013 | Lee et al. |
| 2013/0143101 A1 | 6/2013 | Nakagawa et al. |

(Continued)

FOREIGN PATENT DOCUMENTS

| | | |
|---|---|---|
| CN | 103038917 A | 4/2013 |
| CN | 103069284 A | 4/2013 |

(Continued)

OTHER PUBLICATIONS

European Search Report dated Apr. 1, 2021.
Chinese Office action dated Sep. 30, 2022.

*Primary Examiner* — Brian R Ohara
(74) *Attorney, Agent, or Firm* — Lee IP Law, P.C.

(57) ABSTRACT

A battery pack including a plurality of battery cells; a first case accommodating the plurality of battery cells; a protection circuit module coupled to one side of the plurality of battery cells and electrically connecting the plurality of battery cells; a bus bar electrically connected to the protection circuit module and extending in one direction along the plurality of battery cells; and a second case coupled to the first case and accommodating the plurality of battery cells, the protection circuit module, and the bus bar, wherein the bus bar includes a diverged branch formed by cutting a region of the bus bar in the one direction.

9 Claims, 5 Drawing Sheets

(56) References Cited

U.S. PATENT DOCUMENTS

| | | | |
|---|---|---|---|
| 2014/0017531 A1* | 1/2014 | Uehara | H01M 10/643 |
| | | | 429/82 |
| 2018/0130989 A1 | 5/2018 | Saito et al. | |
| 2020/0243814 A1 | 7/2020 | Kang et al. | |

FOREIGN PATENT DOCUMENTS

| | | |
|---|---|---|
| CN | 205621791 U | 10/2016 |
| CN | 107771362 A | 3/2018 |
| CN | 110100329 A | 8/2019 |
| EP | 2600436 A1 | 6/2013 |
| EP | 2607908 A1 | 6/2013 |
| EP | 3686953 A1 | 7/2020 |
| JP | 4284926 B | 6/2009 |
| JP | 2014103031 A | 6/2014 |
| JP | 5907050 B | 4/2016 |
| KR | 10-0908568 B | 7/2009 |
| WO | WO 2019216218 A1 | 11/2019 |

\* cited by examiner

BATTERY PACK

CROSS-REFERENCE TO RELATED APPLICATION

Korean Patent Application No. 10-2019-0160736, filed on Dec. 5, 2019, in the Korean Intellectual Property Office, and entitled: "Battery Pack," is incorporated by reference herein in its entirety.

BACKGROUND

1. Field

Embodiments relate to a battery pack.

2. Description of the Related Art

Secondary batteries may be charged and discharged, unlike primary batteries, which are not rechargeable once discharged. Low-capacity secondary batteries may be used in portable small-sized electronic devices, e.g., a mobile phone, a camcorder, and the like, and high-capacity secondary batteries may be used as an energy source, e.g., for driving a motor for a hybrid car or the like.

The secondary battery may be manufactured in various shapes, e.g. a cylindrical, prismatic, or pouch type, The secondary battery may be configured such that an electrode assembly formed by interposing a separator as an insulator between a positive electrode plate and a negative electrode plate and accommodated in a case with an electrolyte solution, and a cap plate is installed in the can. Positive and negative electrode terminals may be connected to the electrode assembly and may be exposed and protruded to the outside through the cap plate.

A plurality of secondary batteries may be connected in series, in parallel or in series/parallel, forming a battery pack having an increased high output, which may be used in various fields.

SUMMARY

Embodiments are directed to a battery pack including a plurality of battery cells; a first case accommodating the plurality of battery cells; a protection circuit module coupled to one side of the plurality of battery cells and electrically connecting the plurality of battery cells; a bus bar electrically connected to the protection circuit module and extending in one direction along the plurality of battery cells; and a second case coupled to the first case and accommodating the plurality of battery cells, the protection circuit module, and the bus bar, wherein the bus bar includes a diverged branch formed by cutting a region of the bus bar in the one direction.

The diverged branch may be formed by cutting an inner region of the bus bar to space regions apart in a widthwise direction perpendicular to the one direction.

The diverged branch may be branched off at one side of the bus bar relative to a center of the bus bar relative to the one direction.

Relative to the center of the bus bar in the one direction, the diverged branch may be cut from a region adjacent to a midpoint between the center and an end of the bus bar.

The diverged branch may be branched off by a slit cut in the one direction.

The diverged branch may be an output terminal for an external circuit.

The battery pack may further include a voltage sensor coupled to an end of the bus bar that is adjacent to the diverged branch.

The battery pack may further include case holders between the first case and the second case to fix positions of the battery cells.

The protection circuit module may include wiring patterns overlying the plurality of battery cells and electrically connected to the plurality of battery cells.

The bus bar may extend along edges of the protection circuit module, and protrusions of the bus bar are coupled to coupling holes in the protection circuit module to electrically connect the protection circuit module and the bus bar.

BRIEF DESCRIPTION OF DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Various embodiments of the present disclosure may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

As used herein, the terms "or" and "and/or" include any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "include," "including," "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms, and sequential inclusion of numbered elements are not required. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Hereinafter, a configuration of a battery pack according to an embodiment will be described.

Figure 1:
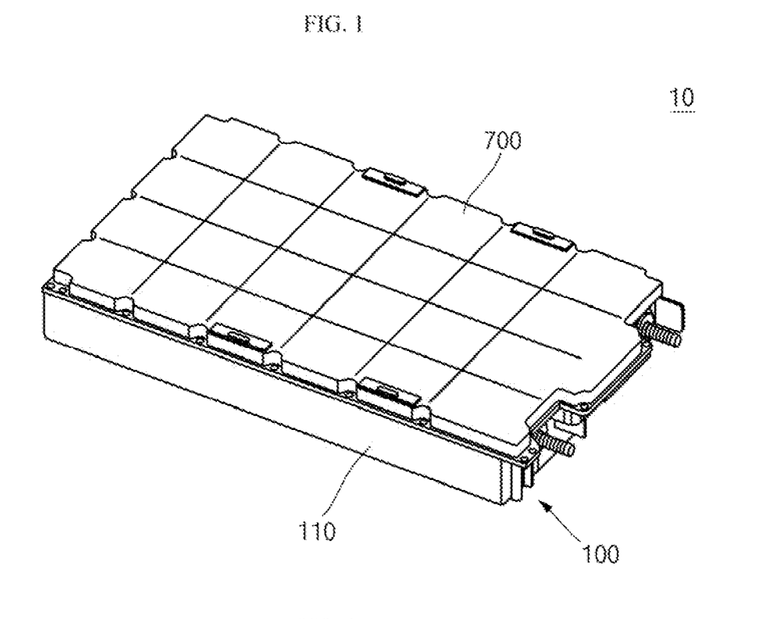
FIG. 1 is a perspective view of a battery pack according to an embodiment.
Figure 2:
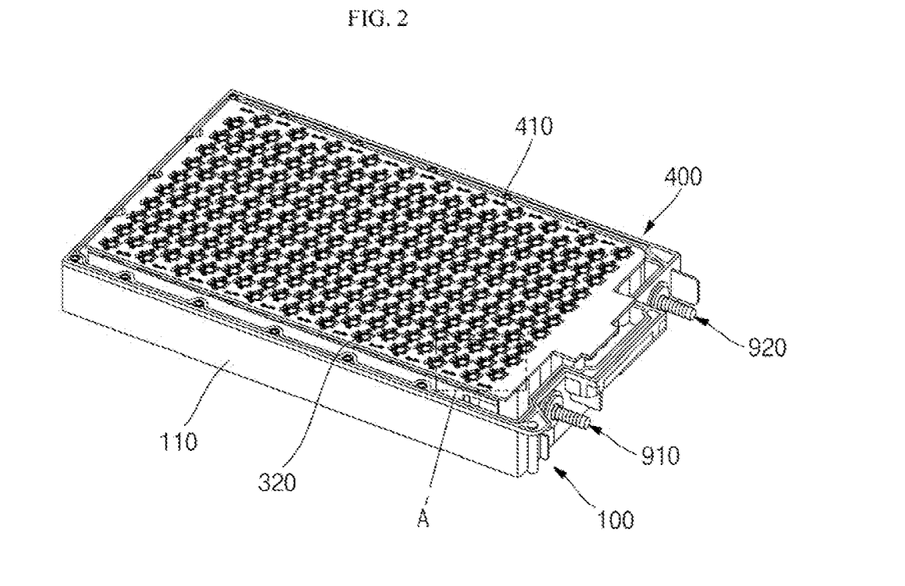
FIG. 2 is a perspective view of a state in which an upper cover is removed from the battery pack shown in FIG. 1.
Figure 3:
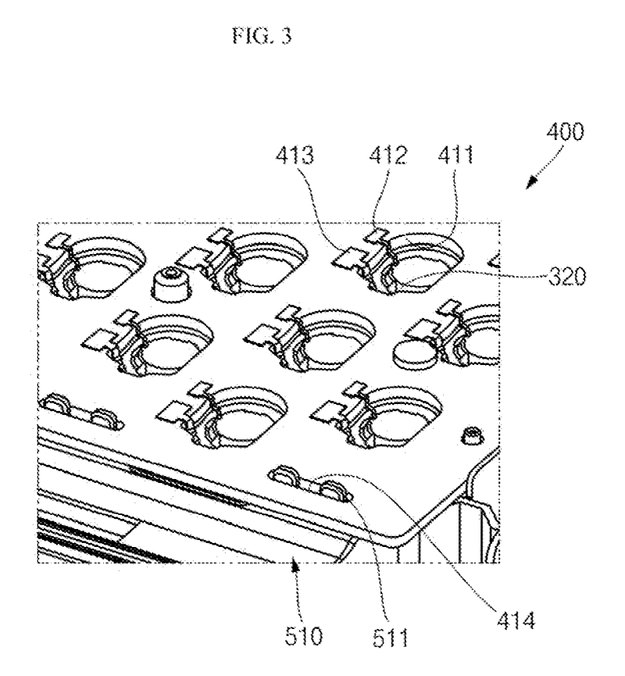
FIG. 3 is an enlarged view of a portion A shown in FIG. 2.
Figure 4:
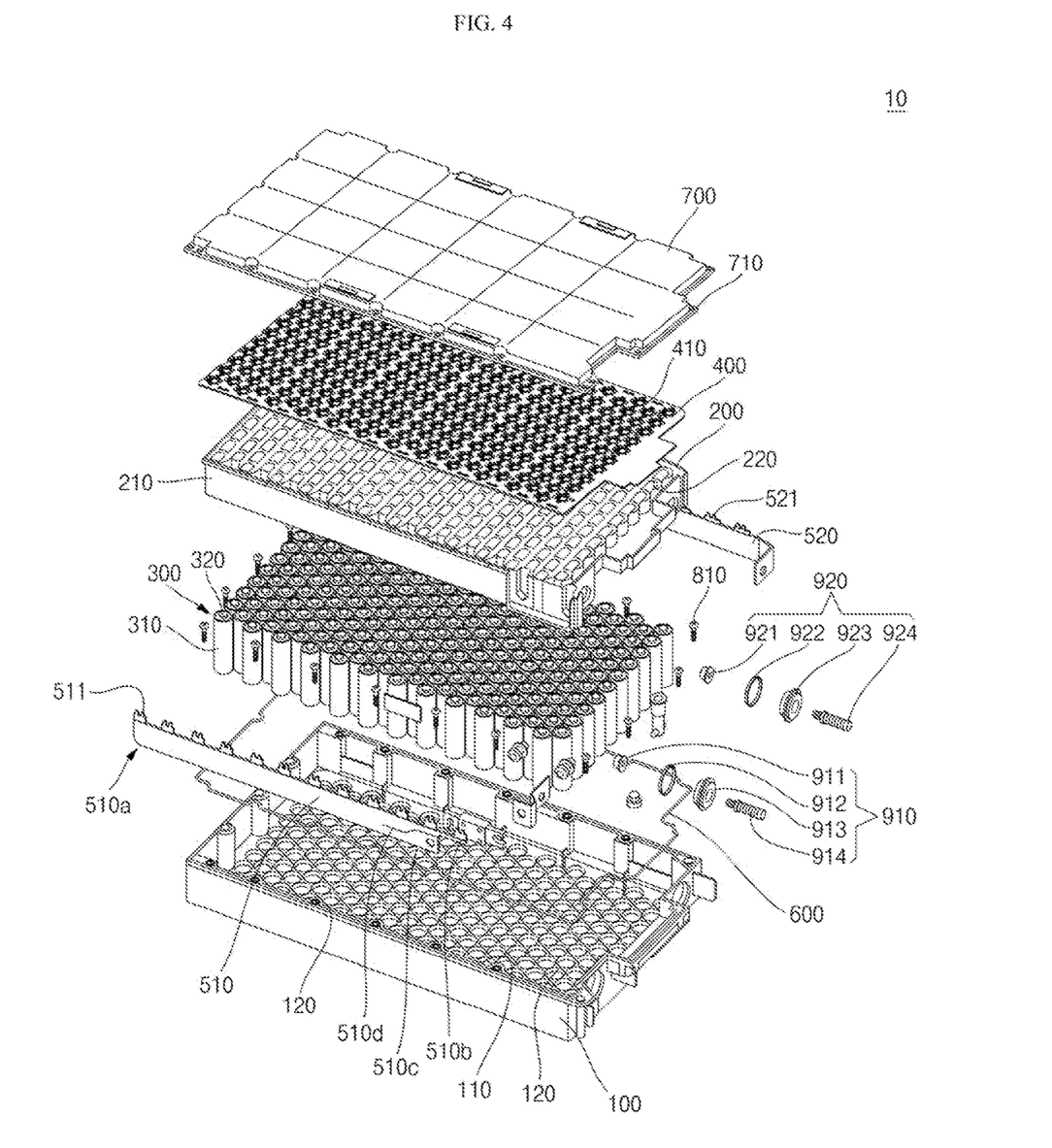
FIG. 4 is an exploded perspective view of the battery pack according to an embodiment.

FIG. 1 is a perspective view of a battery pack according to an embodiment. FIG. 2 is a perspective view of a state in which an upper cover is removed from the battery pack shown in FIG. 1. FIG. 3 is an enlarged view of a portion A shown in FIG. 2. FIG. 4 is an exploded perspective view of the battery pack according to an embodiment.

First, referring to FIGS. 1 to 4, the battery pack 10 according to an embodiment may include a first case 100, a case holder 200, battery cells 300, a protection circuit module 400, bus bars 510 and 520, a sealing member or sealer 600, a second case 700, fasteners 810, and electrode terminals 910 and 920.

In an implementation, the first case 100 may be coupled to the second case 700 to accommodate the battery cells 300 in an internal space defined by the first case 100 and the second case 700. The first case 100 may include a frame 110 defining the shape of the space accommodating the battery cells 300, and lower holders 120. The frame 110 may protect the battery cells 300 accommodated therein from external shocks. In an implementation, the lower holders 120 may help prevent the battery cells 300 from deviating from predetermined positions thereof by fixing lower portions of the battery cells 300.

The case holder 200 may be coupled to the inside of the first case 100 and may be fixed to the inside of the frame 110 of the first case 100. In an implementation, the case holder 200 may be basically constructed by the frame 210 and may include holes 220 corresponding to or aligned with the lower holders 120 of the first case 100. In an implementation, the battery cells 300 fixed to the lower holders 120 of the first case 100 may pass the holes 220 of the case holder 200, and positions of the battery cells 300 may be fixed.

The case holder 200 may be formed using an electrically insulating plastic material. In an implementation, the case holder 200 may be formed using, e.g., polypropylene (PP) or polyethylene (PE).

In an implementation, as illustrated in the drawings, the battery cells 300 may be cylindrical batteries. In an implementation, the battery cells 300 may be prismatic or atypical batteries. Lower portions of the battery cells 300 may be fixed by the lower holders 120 of the first case 100, and side portions thereof may be fixed by passing through the holes 220 of the case holder 200. In an implementation, upper portions of the battery cells 300 may be fixed by the protection circuit module 400 positioned thereon, and positions of the battery cells 300 may be fixed in a state in which they are spaced apart from one another. The cell cases 310 including the lower portions of the battery cells 300 may have a first polarity, and an upwardly protruding cap-up 320 of each of the battery cells 300 may have a second polarity. In an implementation, the first polarity may be a positive polarity and the second polarity may be a negative polarity, or vice versa. The protection circuit module 400 coupled to the upper portions of the battery cells 300 may be connected to the cell cases 310 of the battery cells 300 and the cap-ups 320 through internal wiring patterns 410. In an implementation, the battery cells 300 arranged in such a manner may be electrically connected in various manners including, e.g., in series, in parallel, or in series/parallel, as desired.

The protection circuit module 400 may be coupled to the upper portions of the battery cells 300 and may be covered by the second case 700. The protection circuit module 400 may be basically constructed by an insulating circuit board and may include the wiring patterns 410 corresponding to the battery cells 300. In an implementation, each of the wiring patterns 410 may include a cell-exposing inner wall 411 including a plurality of holes inwardly formed in the protection circuit module 400, and a first wiring pattern 412 and a second wiring pattern 413 formed throughout the cell-exposing inner wall 411. In an implementation, the cell-exposing inner wall 411 may correspond to or overlie each of the positions of the battery cells 300, and the cap-up 320 of each of the battery cells 300 may be positioned inside the cell-exposing inner wall 411. In an implementation, the first wiring pattern 412 and the second wiring pattern 413 may correspond to (e.g., may be provided at) each of the battery cells 300, and may be electrically connected to the cell case 310 and the cap-up 320 of each of the battery cells 300, respectively. In an implementation, the first wiring pattern 412 may be connected to the cell case 310 of the battery cell 300 to have a first polarity, and the second wiring pattern 413 may be connected to the cap-up 320 of the battery cell 300 to have a second polarity. In an implementation, the first wiring patterns 412 and the second wiring patterns 413 may be connected in a connection mode as desired, e.g., in series, in parallel or in series/parallel, within the protection circuit module 400. In an implementation, the battery cells 300 may be electrically connected to one another and may output a desired level of current or voltage.

The protection circuit module 400 may further include coupling holes 414 at edges thereof, and coupling protrusions 511 and 521 along edges of the bus bars 510 and 520, which will be described below, may pass through and be engaged with the coupling holes 414. In an implementation, a coupled state of the bus bar 510 and the protection circuit module 400 may be stably maintained. In an implementation, the protection circuit module 400 may be electrically connected to the coupling holes 414. In an implementation, the bus bars 510 and 520 may be electrically coupled to the protection circuit module 400 and may be electrically connected to the battery cells 300 connected to the protection circuit module 400.

The bus bars 510 and 520 may be made of an electrically conductive material and may be at opposite edges of the protection circuit module 400 along the lengthwise direction of the protection circuit module 400. The bus bars 510 and 520 may receive voltages of first and second polarities from the protection circuit module 400. In an implementation, the bus bars 510 and 520 may receive voltages of various positions of the protection circuit module 400 along the lengthwise direction.

Lengthwise opposite ends of the first bus bar 510 may be defined as a first end 510a that is relatively far from or distal to a voltage sensing terminal, and a second end 510b that is relatively close to or proximate to the voltage sensing terminal, respectively. The second bus bar 520 may also have opposite ends corresponding or analogous to those of the first bus bar 510.

In an implementation, when an output terminal is connected to or via a midpoint C2 of the bus bars 510 and 520, which will be described below, a more accurate average voltage of the battery cells 300 may be sensed from the voltage sensing terminal. A specific connection relationship between the bus bars 510 and 520 will be described below.

The sealer 600 may be between the first case 100 and the second case 700. The sealer 600 may be an elastic member made of an electrically insulating material. In an implementation, the sealer 600 may be a silicon or rubber member or gasket between coupling positions of the two cases 100 and 700 to seal the two cases 100 and 700 to each other.

The second case 700 may be coupled to the first case 100 on top of the first case 100. In an implementation, the second case 700 coupled to the first case 100 may protect internal components, including the battery cells 300, the protection circuit module 400, and so on. The second case 700 may have a planar shape, like the first case 100, and may be coupled to the first case 100 with the sealer 600 positioned therebetween.

In an implementation, the second case 700 may include a plurality of fastening holes 710 spaced apart from one another along the edges thereof, and the second case 700 may be fastened with the first case 100 as the fasteners 810 pass through the fastening holes 710 from above. In an implementation, according to the types of the first case 100 and the second case 700, the first case 100 and the second case 700 may also be coupled to each other without the fastening holes 710 and the fasteners 810. In an implementation, when the first case 100 and the second case 700 may be coupled to each other by hook coupling, and the fastening holes 710 or the fasteners 810 may not be separately provided.

The fasteners 810 may include a plurality of fasteners corresponding to the fastening holes 710 of the second case 700. The fasteners 810 may pass through the fastening holes 710 of the second case 700 from above to reach the first case 100 below the second case 700. In an implementation, the coupling force between the first case 100 and the second case 700 may be maintained through threads. In an implementation, as described above, the coupling of the first case 100 and the second case 700 without the fasteners 810 may also be achieved.

The electrode terminals 910 and 920 may be coupled to the bus bars 510 and 520, respectively, and may be exposed to one side of the case holder 200 and the first case 100. The electrode terminals 910 and 920 may include a first electrode terminal 910 and a second electrode terminal 920, which include first terminal members 911 and 921, second terminal members 912 and 922, third terminal members 913 and 923, and fourth terminal members 914 and 924, respectively.

The first electrode terminal 910 will now be described by way of example. The first terminal member 911 may be connected to one end of the first bus bar 510 to receive a final voltage, the second to fourth terminal members 912 to 914 may be sequentially coupled to the first terminal member 911, and the fourth terminal member 914 may be finally exposed out of the first case 100. In an implementation, the second electrode terminal 920 may also be connected to the second bus bar 520, and the fourth terminal 924 may be finally exposed out of the first case 100. Therefore, an external circuit coupled to the battery pack 10 may be electrically connected through the fourth terminal members 914 and 924, respectively.

Hereinafter, a configuration of a bus bar and detected voltages in the battery pack according to an embodiment will be described in greater detail.

Figure 5:
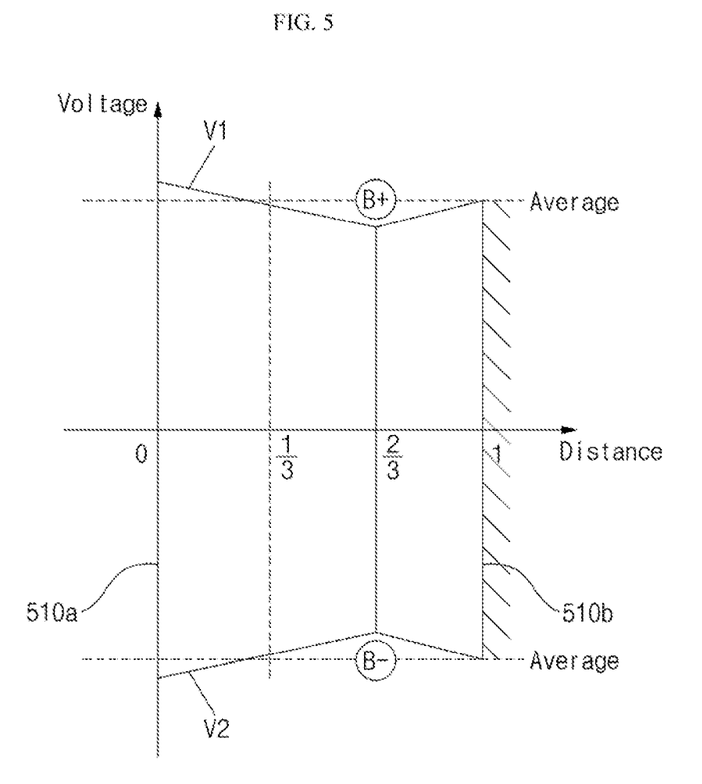
FIG. 5 illustrates voltages detected from various positions of a bus bar in the battery pack according to an embodiment.
Figure 6:
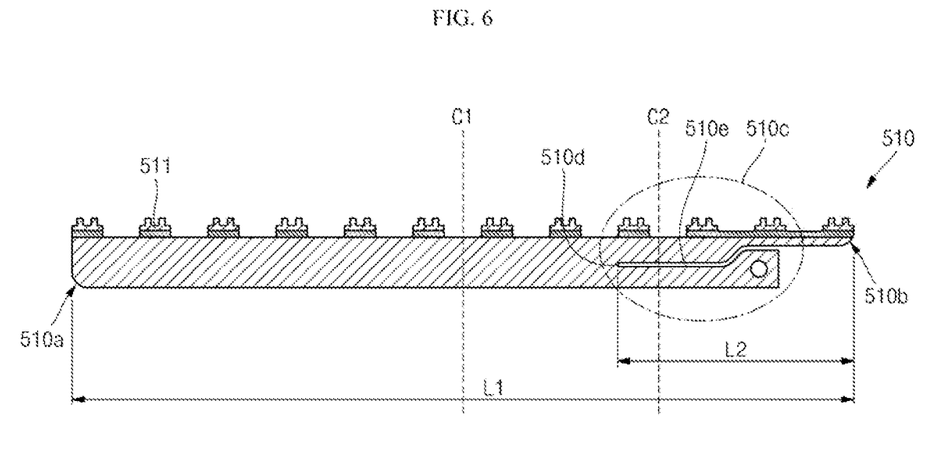
FIG. 6 is a detailed side view of a configuration of the bus bar in the battery pack according to an embodiment.

FIG. 5 illustrates voltages detected from various locations of a bus bar in the battery pack according to an embodiment. FIG. 6 is a detailed side view of a configuration of the bus bar in the battery pack according to an embodiment.

First, referring to FIG. 5, voltages v1 and v2 are indicated on the basis of or at a location on the first bus bar 510 at different positions thereof from the first end 510a to the second end 510b. The second bus bar 520 may also be shaped to correspond to the first bus bar 510. However, for brevity, the voltages are shown and described on the basis of a distance between the first end 510a and the second end 510b of the bus bar 510.

A voltage sensor may be coupled to the second end 510b of the first bus bar 510, and the second end 510b may serve as a voltage sensing terminal of a battery pack. The voltage sensor may be a sensor for sensing the overall voltage of the battery pack, and it may be difficult to install the voltage sensor within the battery pack. In an implementation, the voltage sensor may be coupled to one end of the battery pack. In an implementation, the voltage sensor may be coupled to the second end 510b.

Assuming that the distance between the first end 510a and the second end 510b is 1 (e.g., 1 arbitrary unit), FIG. 5 shows the voltage v1 applied to the first bus bar 510 in a section between the first end 510a to the second end 510b and the voltage v2 applied to the second bus bar 520. A voltage difference (v1−v2) between the first bus bar 510 and the second bus bar 520, which is obtained from the voltage v1 applied to the first bus bar 510 and the voltage v1 applied to the first bus bar 510, may also be so distributed as shown in FIG. 5. In an implementation, as shown in FIG. 5, the voltage difference (v1−v2) may gradually decrease from the first end 510a along the lengthwise direction of the first bus bar 510. In an implementation, the voltage difference (v1−v2) between the opposite ends of the bus bar 510 may be a minimum value at a two thirds (⅔) point of the overall length, starting from the first end 510a, e.g., a one third (⅓) point from the second end 510b, and may increase after passing the point. In an implementation, as shown in FIG. 5, when the region between the first end 510a to the second end 510b is divided into about three sections, a maximum voltage of the battery pack may appear at the first end 510a, and a minimum voltage of the battery pack may appear at the two thirds (⅔) point. In addition, the average voltage of the battery pack having the battery cells 300 may appear at a point being between the first end 510a and the second end 510b, e.g., a one third (⅓) point from the first end 510a. In an implementation, the average voltage of the battery pack 10 may also appear at the second end 510b.

Referring to FIG. 6, the specific configuration of the first bus bar 510 for achieving the above is shown. As shown in FIG. 6, assuming that the overall length of the first bus bar 510 from first end portion 510a to the second end portion 510b is denoted by L1, the first bus bar 510 may include a diverged branch 510c located at about the ⅔ point from the first end 510a. The diverged branch 510c may be a branch off from the first bus bar 510, e.g., through or due to the presence of a cutting hole 510e (e.g., slit) cut to a cut portion or divergence point 510d located at about the ⅔ point from the first end 510a.

In an implementation, the cutting hole 510e may be in the form of a slit produced by cutting into the first bus bar 510 from the second end 510b (e.g., in a region closer to a midpoint C2 than to a center C1 of the first bus bar 510) in the lengthwise direction. The midpoint C2 may be a midpoint between the center C1 and the second end 510b of the first bus bar 510. In an implementation, a length L2 from the divergence point 510d to the second end 510b may be about one third ⅓ of the overall length L1.

In an implementation, an output terminal may be connected to the diverged branch 510c (e.g., at the circular hole therein), and outputs of the battery pack 10 according to the embodiment may be applied to an external circuit. In an implementation, the second bus bar 520 may also include a diverged branch located to correspond to the first bus bar 510 to apply outputs of first and second polarities, e.g., B+ and B−, to the external circuit.

In an implementation, referring to FIGS. 5 and 6, divergence for outputting may be made at the divergence point 510d, which may correspond to about the ⅔ point of the overall length L1 of the bus bars 510 and 520, using the diverged branches of the bus bars 510 and 520, and the voltage may be lowest at the divergence point 510d. Accordingly, the bus bars 510 and 520 according to the present disclosure may have a voltage distribution as shown in FIG. 5. In an implementation, the average voltage of the maximum voltage at the first end 510a of the bus bar 510 and the minimum voltage at the divergence point 510d of the bus bar 510 may be at the second end 510b of the bus bar 510, and the voltage sensor installed at the second end 510b of the bus bar 510 may accurately sense the average voltage of the battery pack 10.

In an implementation, with diverged branch structures of the bus bars 510 and 520, voltage differences at various regions may be minimized. In other bus bars without a diverged branch structure, e.g., an output of a battery pack may be applied from one-side end of the bus bar, and the voltage of an output from the output end may be lowest, increasing a voltage difference between the output end portion and an end portion having the maximum voltage, which is opposite to the output end. Therefore, potential differences between opposite ends in the bus bars 510 and 520 may be increased, resulting in a voltage imbalance.

In the battery pack 10 according to the embodiment of the present disclosure, as shown in FIG. 5, a difference between the maximum voltage at the first end 510a and the minimum voltage at the divergence point 510d from which the diverged branch 510c starts may be minimized by forming the diverged branch 510c at the ⅔ point of the overall length from the first end portion 510a. Voltage imbalance issues may be minimized.

Hereinafter, a voltage distribution in the battery pack according to an embodiment will be described.

Figure 7:
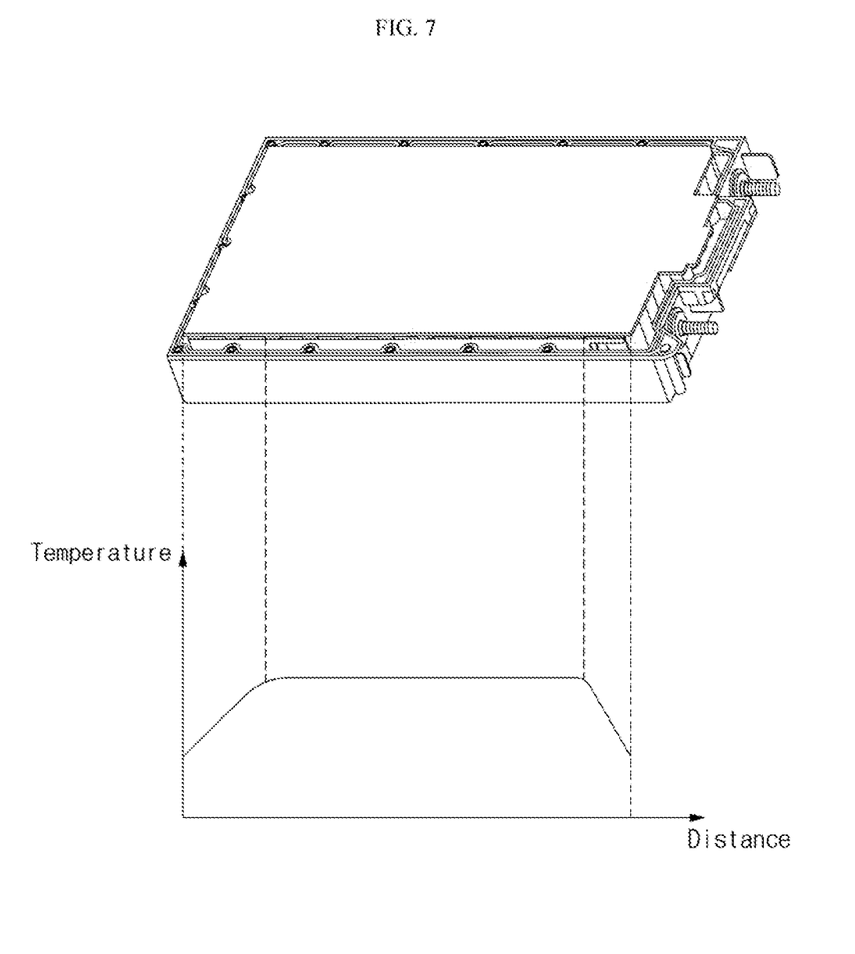
FIG. 7 illustrates a cell voltage distribution depending on the load in the battery pack according to an embodiment.

FIG. 7 illustrates a cell voltage distribution depending on the load in the battery pack according to an embodiment.

Referring to FIG. 7, it may be that the temperature of the battery pack 10 may be highest at about a ⅔ point to which the output terminal is connected, and the temperature may gradually decrease toward opposite sides away from the ⅔ point. In an implementation, as shown in FIG. 7, it may be seen that when the output terminals shown in FIG. 5 are connected to the battery pack 10, the temperature of the battery pack 10 may be highest at points to which the outputs B+ and B− are applied, and the temperatures may gradually decrease after passing the points. In an implementation, as shown in FIG. 7, the temperature distribution may be generally uniformly maintained in view of the output points. Thus, it may be seen from the temperature distribution of the battery pack 10 that a temperature imbalance may be compensated for in a similar manner to that of the voltage distribution.

By way of summation and review, a battery pack may output high power, a voltage or temperature balance between the battery cells in the battery pack may be maintained.

One or more embodiments may provide a battery pack including a plurality of battery cells connected to one another, which is capable of accurately sensing an output voltage and compensating for a voltage imbalance at a bus bar.

As described above, the battery pack according to the present disclosure may include output terminals connected to each other by forming the diverging branch extending from the central region of the bus bar, thereby accurately sensing the output voltage at an end of the bus bar and maintaining voltage and temperature balances.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A battery pack, comprising:
a plurality of battery cells;
a first case accommodating the plurality of battery cells;
a protection circuit module coupled to one side of the plurality of battery cells and electrically connecting the plurality of battery cells;
a bus bar electrically connected to the protection circuit module and extending in one direction along the plurality of battery cells; and a second case coupled to the first case and accommodating the plurality of battery cells, the protection circuit module, and the bus bar,
wherein the bus bar includes a diverged branch formed by cutting a region of the bus bar in the one direction, and
wherein the diverged branch is branched off by a slit cut in the one direction,
wherein the slit includes:
a first portion extending inward from one end of the bus bar in the one direction,
a second portion extending inwardly from an inward end of the first portion, the second portion extending in a direction that is inclined with respect to the one direction, and
a third portion extending inwardly from an inward end of the second portion, the third portion extending in the one direction in parallel with the first portion.

2. The battery pack as claimed in claim 1, wherein the diverged branch is formed by cutting an inner region of the bus bar to space regions apart in a widthwise direction perpendicular to the one direction.

3. The battery pack as claimed in claim 1, wherein the diverged branch is branched off at one side of the bus bar relative to a center of the bus bar relative to the one direction.

4. The battery pack as claimed in claim 3, wherein relative to the center of the bus bar in the one direction, the diverged branch is cut from a region adjacent to a midpoint between the center and an end of the bus bar.

5. The battery pack as claimed in claim 1, wherein the diverged branch is an output terminal for an external circuit.

6. The battery pack as claimed in claim 1, further comprising a voltage sensor coupled to an end of the bus bar that is adjacent to the diverged branch.

7. The battery pack as claimed in claim 1, further comprising case holders between the first case and the second case to fix positions of the battery cells.

8. The battery pack as claimed in claim 1, wherein the protection circuit module includes wiring patterns overlying the plurality of battery cells and electrically connected to the plurality of battery cells.

9. The battery pack as claimed in claim 8, wherein the bus bar extends along edges of the protection circuit module, and protrusions of the bus bar are coupled to coupling holes in the protection circuit module to electrically connect the protection circuit module and the bus bar.

* * * * *